United States Patent [19]  
Saito

[11] Patent Number: 4,599,659  
[45] Date of Patent: Jul. 8, 1986

[54] FLOPPY DISK DRIVE APPARATUS

[75] Inventor: Shunji Saito, Numazu, Japan

[73] Assignee: Tokyo Electric Co., Ltd., Tokyo, Japan

[21] Appl. No.: 607,256

[22] Filed: May 4, 1984

[30] Foreign Application Priority Data

May 13, 1983 [JP] Japan .................................. 58-83852

[51] Int. Cl.⁴ .............................................. G11B 5/54
[52] U.S. Cl. ..................................................... 360/75
[58] Field of Search ................................... 360/75, 78

[56] References Cited

U.S. PATENT DOCUMENTS 4,395,742  7/1983  Ostroff ................................. 360/78
4,547,820 10/1985  Saito ..................................... 360/71
4,563,712  1/1986  Nishio .................................. 360/75

FOREIGN PATENT DOCUMENTS

0126371 11/1984  European Pat. Off. ............... 360/75
2082824  3/1982  United Kingdom .................. 360/75

Primary Examiner—George G. Stellar  
Attorney, Agent, or Firm—Frishauf, Holtz, Goodman & Woodward

[57] ABSTRACT

A floppy disk drive apparatus includes a control signal generating circuit for generating a step signal and a direction instruction signal, head driving section for driving a magnetic head in the radial direction of a floppy disk, and a detector circuit for generating an output signal when the magnetic head locates in the outer limit location of the floppy disk. The detector circuit is inhibited from generating an output signal in response to the direction instruction signal generated for driving the magnetic head in an inner direction of the floppy disk.

10 Claims, 8 Drawing Figures

FLOPPY DISK DRIVE APPARATUS

BACKGROUND OF THE INVENTION

The present invention relates to a floppy disk drive apparatus.

A floppy disk drive apparatus is known which shifts a magnetic head in the radial direction of a floppy disk fitted over a spindle, while rotating the floppy disk, and a data write/read operation is effected with respect to the floppy disk. The floppy disk drive apparatus of this type is adapted to control the operation of a motor for rotating the spindle and pulse motor for linearly moving a magnetic head, and is connected to a host computer for effecting a data write/read operation with respect to the floppy disk through the magnetic head. The apparatus includes a detector for optically detecting that the magnetic head is placed in a reference track position or a track zero position and is adapted to supply a track zero sinal to the host computer when motor drive signals in a predetermined phase relation are supplied to the pulse motor while an output signal is being generated from the detector. Since, in this case, the detector optically detects the position of the magnetic head, it cannot detect the track zero position of the magnetic head accurately. Where the pulse motor is a four-phase motor which is driven, for example, according to a 2-phase excitation method to cause the head to be moved by one track each time the phase of the motor drive signal varies, the motor drive signal comes to have the same phase relation each time the magnetic head is moved by four tracks. If an output signal is generated from the detector when the magnetic head is moved to a position four tracks away from the track zero position, there is a possibility that a track zero signal will be generated from the floppy disk drive apparatus to the host computer as the case may be. It is, therefore, required that the positional relation of the detector and magnetic head is accurately set to permit the detector to stop the generation of an output signal before the magnetic head is moved inwardly four tracks from the reference track position.

Recently, a double track system has been developed in which tracks are formed in high density. In this case, the rotation angle corresponding to one step of the pulse motor becomes one half, making it difficult to set the magnetic head and detector in place. Even in a floppy disk drive apparatus for generating two pulses to move the magnetic head by one track, it is difficult to correctly set a relative position between the magnetic head and the detector.

SUMMARY OF THE INVENTION

It is accordingly the object of the present invention to provide a floppy disk drive apparatus which can prevent a track zero signal from being generated inadvertently.

The object of the present invention is achieved by a floppy disk drive apparatus comprising a control signal generating circuit for generating a step signal and direction instruction signal, a first drive section for rotating a floppy disk, a second drive section for causing a carrier to which a magnetic head is attached to be driven in the radial direction of the floppy disk in response to the step signal and direction instruction signal, a detecting circuit for generating an output signal when it detects that the magnetic head is placed in the outer limit location of the floppy disk, and an inhibiting circuit for inhibiting the detecting circuit from generating an output signal in response to the direction instruction signal generated from the control signal generating circuit to move the magnetic head in the inner direction of the floppy disk.

According to the present invention, a track zero signal is generated only when the magnetic head is driven in the outer peripheral direction of the floppy disk and reaches a track zero position, and is inhibited from being generated when the magnetic head is driven in the inner direction of the floppy disk.

DETAILED DESCRIPTION OF THE PREFERRED EMBODIMENT

Figure 1:
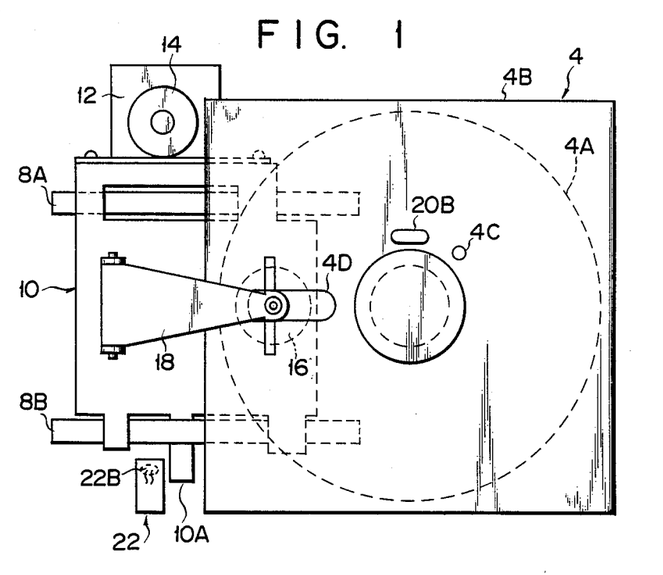
FIGS. 1 and 2 are a schematic top plan view and a side elevational view of a floppy disk drive apparatus according to one embodiment of the present invention.
Figure 2:
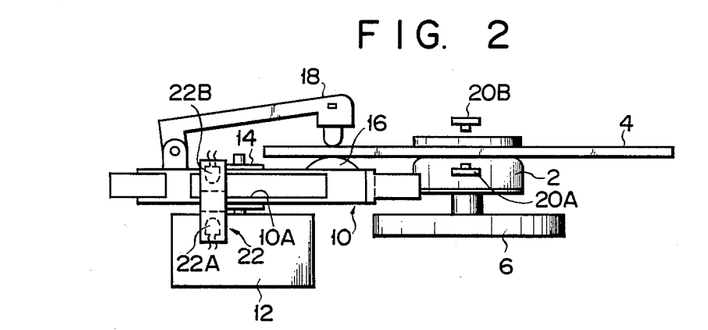

FIGS. 1 and 2 are a schematic top plan view and a side elevational view illustrating a floppy disk drive apparatus according to one embodiment of the present invention. This floppy disk driving apparatus comprises a spindle 2 for holding a floppy disk 4; a motor 6 for rotating this spindle 2; two fixed shafts 8A and 8B; a head carrier 10 slidably attached on these shafts 8A and 8B; and a motor 12 for driving this head carrier 10 along the shafts 8A and 8B throuth a pulley 14. The floppy disk 4 has a disk medium 4A and a casing 4B for enclosing this disk medium 4A. An index hole 4C is formed in this floppy disk 4, while a long hole 4D extending in the radial direction of the disk medium 4A is formed in the casing 4B. A magnetic head 16 and a pressure-contacting member 18 for pressing the disk medium 4A onto the magnetic head 16 through the long holes 4D are attached on and over the head carrier 10. Furthermore, this floppy disk drive apparatus has an index sensor formed of a light emitting diode 20A and a phototransistor 20B for generating an output signal when the index hole 4C of the floppy disk 4 is detected; and outer peripheral limit location detector 22 for generating an inhibition signal to a motor control circuit (not shown) for driving the motor 12 when a projecting portion 10A of the carrier 10 is detected, thereby inhibiting the movement of the carrier 10 out of a predetermined range. This outer peripheral limit location detector 22 is constituted by a light emitting diode 22A and a phototransistor 22B.

Figure 3:
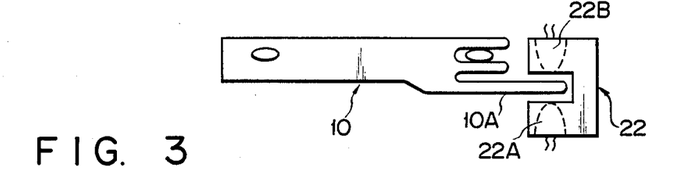
FIG. 3 is a diagram to explain the relative positional relationship between the carrier and the outer peripheral limit location detector shown in FIGS. 1 and 2.

FIG. 3 shows the positional relationship between the outer peripheral limit location detector 22 and the carrier 10. This detector 22 generates an output signal when light emitted from the light emitting diode 22A to the phototransistor 22B is interrupted by the projecting portion 10A of the carrier 10.

Figure 4:
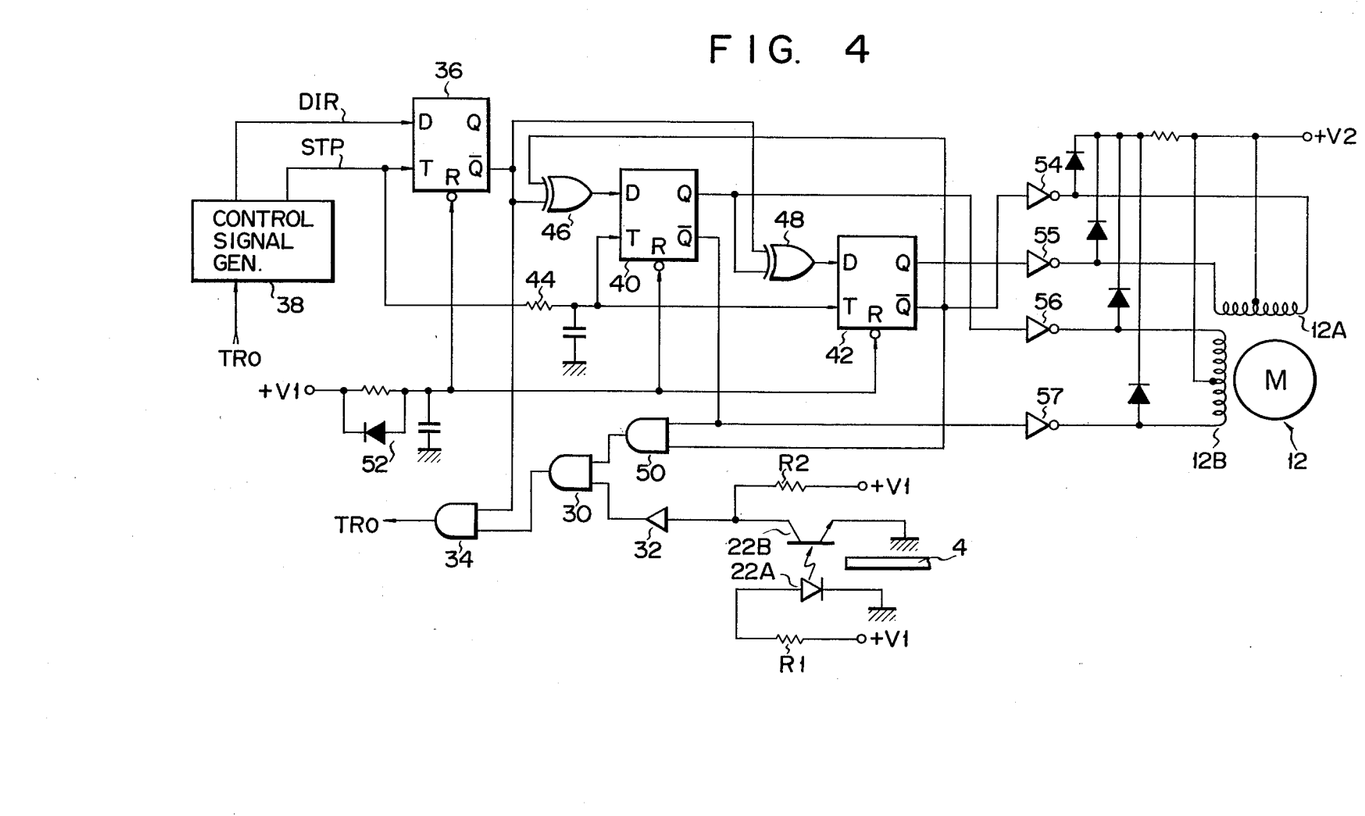
FIG. 4 is a circuit diagram of a control circuit of a floppy disk drive apparatus according to one embodiment of this invention.

FIG. 4 is a circuit diagram of a control circuit of a floppy disk drive apparatus according to one embodiment of the present invention. In this circuit, a light emitting diode 22A is energized by a current supplied from a power supply terminal +V through a resistor R1 and emits the light. The emitter of the phototransistor 22B is grounded and the collector is connected to the power supply terminal +V through a resistor R2. The collector of the phototransistor 22B is also connected to one input terminal of an AND gate 30 through a buffer 32. The output terminal of the AND gate 30 is connected to one input terminal of the AND gate 34 which is connected at the other input terminal to a $\overline{Q}$ output terminal of a flip-flop 36 operating as a latch circuit. In addition, a direction instruction signal DIR from a control signal generating circuit 38 is supplied to the D input terminal of the flip-flop 36. A step signal STP from the control signal generating circuit 38 is supplied to a T input terminal of the flip-flop 36 directly, and to T input terminals of flip-flops 40 and 42, through an integrating circuit 44. An output terminal of an exclusive OR gate 46 whose one input terminal is connected to a $\overline{Q}$ output terminal of the flip-flop 42 is coupled to a D input terminal of the flip-flop 40. On the other hand, an output terminal of an exclusive OR gate 48 whose one input terminal is connected to a Q output terminal of the flip-flop 40 is coupled to a D input terminal of the flip-flop 42. A $\overline{Q}$ output terminal of the flip-flop 36 is connected to the other input terminal of these exclusive OR gates 46 and 48. The $\overline{Q}$ output terminals of the flip-flops 40 and 42 are respectively connected to input terminals of an AND gate 50 whose output terminal is connected to the other input terminal of the AND gate 30. In addition, an initial reset circuit 52 is connected to reset terminals of the flip-flops 36, 40 and 42. $\overline{Q}$ and Q output signals from the flip-flop 42 are supplied as motor drive signals $\phi_A$ and $\phi_C$ and Q and $\overline{Q}$ output signals of the flip-flop 40 are supplied as motor drive signals $\phi_B$ and $\phi_D$ to the stepping motor 12. The motor drive signals $\phi_A$ and $\phi_C$ are supplied through inverters 54 and 55 to respective ends of an energizing coil 12A of the stepping motor 12, and the motor drive signals $\phi_B$ and $\phi_D$ are supplied through inverters 56 and 57 to respective ends of an energizing coil 12B of the stepping motor 12. The center taps of the energizing coils 12A and 12B are each connected to the power source terminal +V2.

The operation of the circuit shown in FIG. 4 will now be described below. When the power supply is first turned on, the flip-flops 36, 40 and 42 are reset by the initial reset circuit 52. Consideration is now given to the case where the magnetic head 16 is driven toward the outer periphery of the floppy disk 4. Assume also that a step signal STP is generated from the control signal generating circuit 38 and at the same time a direction instruction signal of "0" level is generated therefrom. Under this condition, the $\overline{Q}$ output signal of the flip-flop 36 is kept at "1" level. Since the phototransistor 22B is conductive in this case, a "0" signal is generated from the AND gate 30. The output states of the flip-flops 40 and 42 are changed in response to the pulse signal STP, causing the logic state of the drive signals $\phi_A$, $\phi_B$, $\phi_C$, and $\phi_D$ to be changed in accordance with a predetermined sequence. Due to this, the motor 12 is rotated for example in the forward direction and the head 16 is driven in the outer peripheral direction of the floppy disk 4. When the magnetic head 16 reaches near the outer peripheral limit location of the floppy disk 4 and the light from the light emitting diode 22A to the phototransistor 22B is interrupted by the projecting portion 10A of the carrier 10, the phototransistor 22B is rendered nonconductive, so that a "1" level signal is supplied from the buffer 32 to the AND gate 30. When $\overline{Q}$ output signals of "1" are generated from the flip-flops 40 and 42 in this state, namely, when the drive signals $\phi_A (= "1")$, $\phi_B (= "0")$, $\phi_C (= "0")$, and $\phi_D (= "1")$ are generated, a signal "1" is supplied from the AND gate 50 to the AND gate 30. Thus, a signal "1" is generated from the AND gate 30 and then supplied as a track zero signal TRo through the AND gate 34 which is enabled by the $\overline{Q}$ output signal of the flip-flop 36. For example, this track zero signal TRo is supplied to the control signal generating circuit 38 to inhibit the control signal generating circuit 44 from generating the step signal STP to the trigger terminals of the flip-flops 40 and 42. Therefore, the rotation of the motor 12 in the forward direction is inhibited and it is inhibited that the magnetic head 16 is further driven in the outer peripheral direction of the floppy disk 4, so that the magnetic head 16 is stopped in the outer peripheral limit location. Assume now that the direction instruction signal DIR from the control signal generating circuit 38 is changed to the "1" level in this state and the control signal generating circuit 38 starts to generate the step signal STP. Then, the flip-flop 36 is set to the "1" output state in response to the step signal STP. At the same time, the step signal STP from the control signal generating circuit 38 is supplied through the integrating circuit 44 to the trigger terminals of the flip-flops 40 and 42, thereby allowing these flip-flops 40 and 42 to be set into the "1" and "0" output states, respectively. As described above, whenever the step signal is generated from the control signal generating circuit 38, the output states of the flip-flops 40 and 42 are changed and the logic state of the drive signals $\phi_A$, $\phi_B$, $\phi_C$ and $\phi_D$ are changed in accordance with the sequence different from that in the former case. Due to this, the motor 12 is rotated reversely and the magnetic head 16 is driven in the inner peripheral direction of the floppy disk 4. When the magnetic head 16 has reached the fourth track from the track zero position, the drive signals $\phi_A (= "1")$, $\phi_B (= "0")$, $\phi_C (= "0")$ and $\phi_D (= "1")$ are again generated, causing a signal "1" to be generated from the AND gate 50. If, in this case, the light from the light emitting diode 22A to the phototransistor 22B is still interrupted by the projecting portion 10A of the carrier 10, a "1" level signal is supplied from the buffer 32 to the AND gate 30, causing a "1" level signal to be generated from the AND gate 30. However, since the AND gate 34 is disabled by the $\overline{Q}$ output signal of "0" level from the flip-flop 36, no track zero signal TRo is generated from the AND gate 34.

In this embodiment, a track zero signal TRo is generated when the magnetic head 16 is moved in the outer peripheral direction of the floppy disk 4 and reaches the track zero position, and is inhibited from being generated when the magnetic head 16 is moved in the inner direction of the floppy disk.

The flip-flop 36 is set to an output state, corresponding to the direction instruction signal DIR, in response to the step signal STP. When, for example, the magnetic head 16 reaches the track zero position to permit a track zero signal to be generated and the generation of the step signal STP to be stopped, the flip-flop 36 is held in an output state "0" irrespective of the level of a direction instruction signal from the control signal generating circuit 38. Unless, in this case, the step signal is generated, it is possible to continue the generation of the track zero signal TRo from the AND gate 34 without holding the direction instruction signal DIR at the "0" level.

Figure 5:
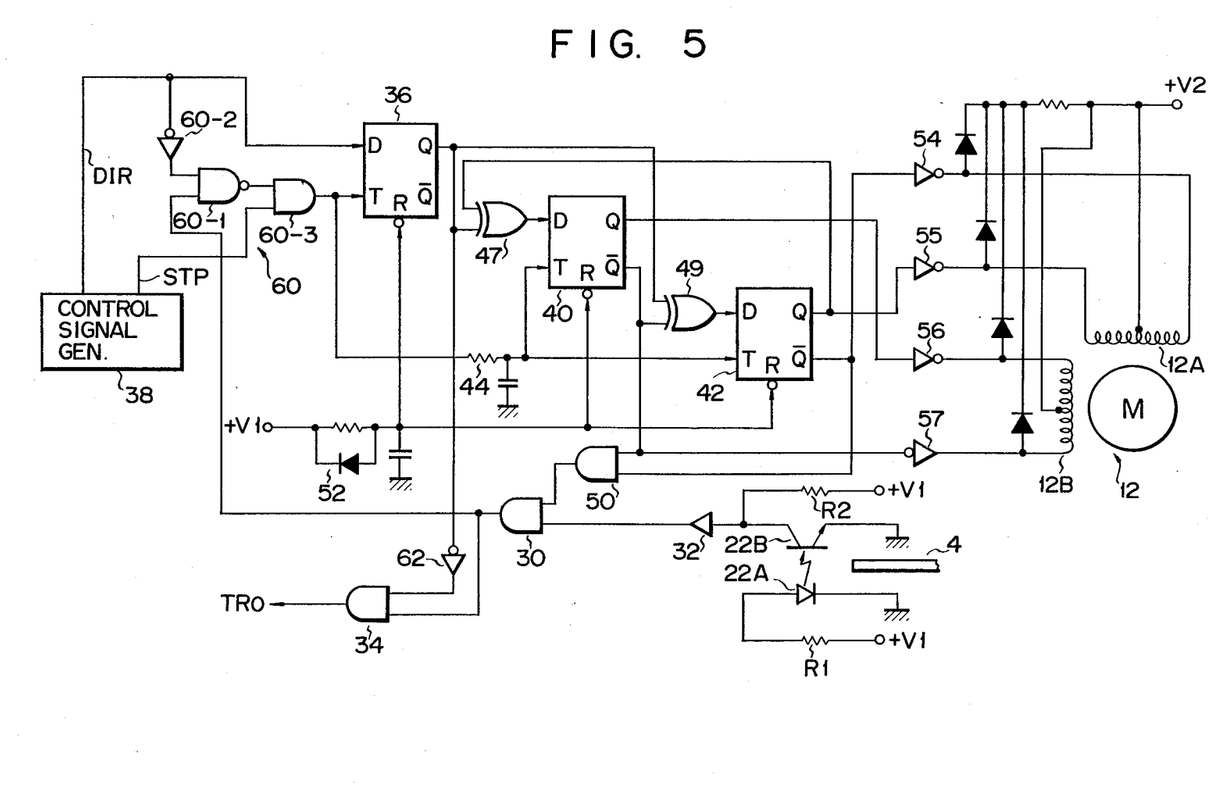
FIG. 5 is a circuit diagram of a control circuit of a floppy disk drive apparatus according to another embodiment of the present invention.

FIG. 5 shows a control circuit of a floppy disk drive apparatus according to another embodiment of the present invention. The control circuit of this embodiment is substantially the same as that of FIG. 4, except that use is made of a logic circuit 60 for controlling a step signal STP from the control signal generating circuit 38 and that exclusive OR gates 47 and 49 are used in place of exclusive OR gates 46 and 48. The Q output terminals of flip-flop circuits 36 and 42 are connected to the input terminals of the exclusive OR gate 47, and the Q and $\overline{Q}$ output terminals of the flip flops 36 and 40, respectively, are connected to the input terminals of the exclusive OR gate 49. The Q output terminal of the flip-flop 36 is connected to one input terminal of an AND gate 34 through an inverter 62.

The logic circuit 60 includes a NAND gate 60-1 having one input terminal connected to the output terminal of an AND gate 30 and the other input terminal connected to receive a direction instruction signal DIR which is supplied from a control signal generating circuit 38 through an inverter 60-2, and an AND gate 60-3 having one input terminal connected to receive an output signal of the NAND gate 60-1, the other input terminal connected to receive a step signal STP from the control signal generating circuit 38, and an output terminal connected to the trigger terminals of the flip-flop 36, 40 and 42.

In this embodiment, when the magnetic head 16 is moved in the outer direction of the floppy disk 4, the control signal generating circuit 38 produces a step signal STP and a "0" level direction instruction signal DIR. In this case, unless the magnetic head 16 is moved to the track zero position, a "0" level signal is generated from the AND gate 30, a "1" level signal is generated from the NAND gate 60-1, and the step signal STP is supplied to the trigger terminals of the flip-flops 36, 40 and 42 through the AND gate 60-3. Thus, the stepping motor 12 is rotated in the forward direction to permit the magnetic head 16 to be moved in the outer direction of the floppy disk. When, in this way, the magnetic head 16 reaches the track zero position, the AND gate 30 produces a "1" level signal. By so doing, a "0" level signal is generated from the NAND gate 60-1, causing the AND gate 60-3 to be disabled, thus inhibiting a supply of the step signal STP to the flip-flops 36, 40 and 42. As a result, even if the step signal STP continues to be generated from the control signal generating circuit 38, the stepping motor 12 is no longer rotated in the forward direction.

When a direction instruction signal DIR of "1" level is generated from the control signal generating circuit 38, the NAND gate 60-1 delivers a "1" level signal to the AND gate 60-3 to cause the latter to be enabled. As a result, a step signal is again supplied to the trigger terminals of the flip-flops 36, 40 and 42, causing the stepping motor 12 to be rotated in the reverse direction. Since, in this case, the flip-flop 36 is set to an output state "1", the AND gate 34 is disabled by a "0" level signal which is supplied through the inverter 62. When the magnetic head 16 is moved in the inner direction of the floppy disk 4, no track zero signal TRo is generated.

Figure 6:
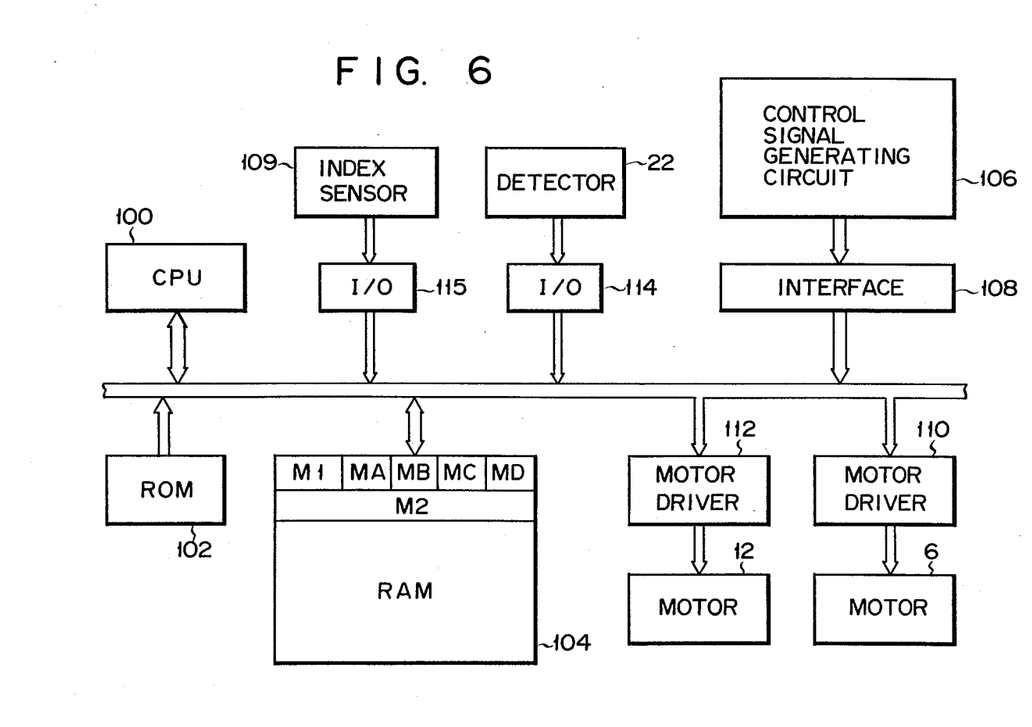
FIG. 6 is a block diagram of a floppy disk drive apparatus having a CPU according to another embodiment of the present invention.

FIG. 6 is a block diagram of a floppy disk drive apparatus according to still another embodiment of the present invention. This floppy disk drive apparatus has a central processing unit (CPU) 100; a read only memory (ROM) 102 and a random access memory (RAM) 104 which are coupled to this CPU 100 through a data bus; and a control signal generating circuit 106 coupled to the CPU 100 through an interface 108. Furthermore, the motors 6 and 12, outer peripheral limit location detector 22 and an index sensor 109 are coupled to the CPU 100 through motor drivers 110 and 112 and I/O ports 114 and 115, respectively.

The RAM 104 has a memory area M1 for storing the data to inhibit that the magnetic head 16 is driven in the inner peripheral direction immediately after the power supply is turned on; memory areas MA, MB, MC, and MD for storing the data corresponding to the drive signals $\phi_A$, $\phi_B$, $\phi_C$ and $\phi_D$; and a memory area M2 for storing the data representing the track position of the floppy disk 4 where the magnetic head 16 exists.

The control signal generating circuit 106 generates the step signal STP and direction instruction signal DIR which are necessary to drive the motor 12, and a motor control signal necessary to drive the motor 6 and the like in response to key signals from, e.g., an external keyboard circuit.

Figure 7:
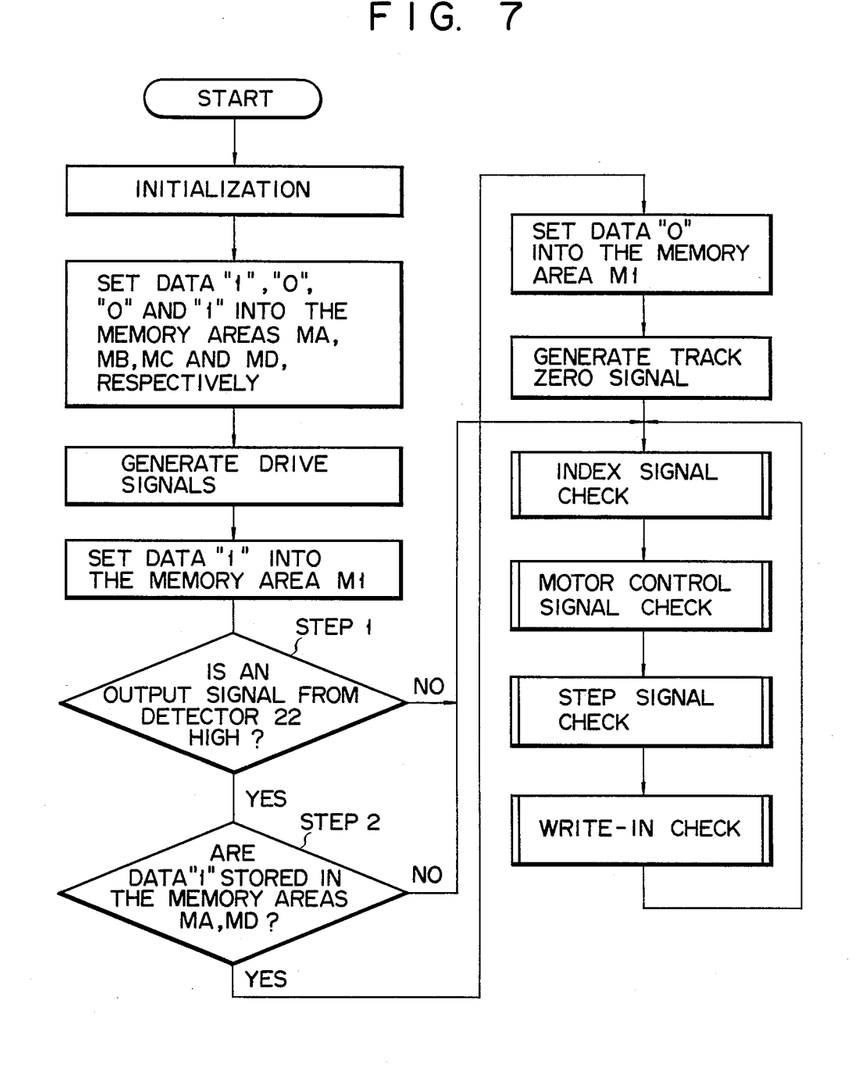
FIG. 7 is a flowchart of a main routine to be executed by the CPU shown in FIG. 6.

The CPU 100 executes a main routine such as shown in FIG. 7 on the basis of program data stored in the ROM 102. First, when the power supply is turned on, an initialization processing such as to clear all contents of the RAM 104 and the like is executed. Next, data "1", "0", "0", and "1" are set into the memory areas MA, MB, MC and MD in the RAM 104, respectively, and at the same time the drive signals $\phi_A$, $\phi_B$, $\phi_C$ and $\phi_D$ corresponding to the contents of these memory areas MA, MB, MC and MD are supplied to the motor driver 112. Subsequently, data "1" is set into the memory area M1. Then, it is checked whether or not an output signal of high level is generated from the detector 22, namely, whether or not the light from the light emitting diode 22A is interrupted by the projecting portion 10A of the carrier 10 (in STEP 1). In the case where it is detected that the output signal of high level is generated from the detector 22 in STEP 1, it is further checked whether or not data "1", "0", "0", and "1" are stored in the memory areas MA, MB, MC and MD, respectively (in STEP 2). In the case where an answer "YES" is obtained in this STEP 2, the CPU 100 sets data "0" into the memory area M1 and at the same time generates a track zero signal representing that the magnetic head 16 is at present in the track zero position. If the answer is "NO" in STEP 1 or 2, the CPU 100 executes the index signal check to control the rotation of the motor 6 in response to an output signal from the index sensor 109; the motor control signal check to control the rotation of the motor 6 in response to a motor control signal from the control signal generating circuit 106; the step signal check which will be described later with reference to FIG. 8; and the write-in check to execute the read-write operation to the floppy disk 4 through the magnetic head 16 in response to a write/read signal from the control signal generating circuit 106.

Figure 8:
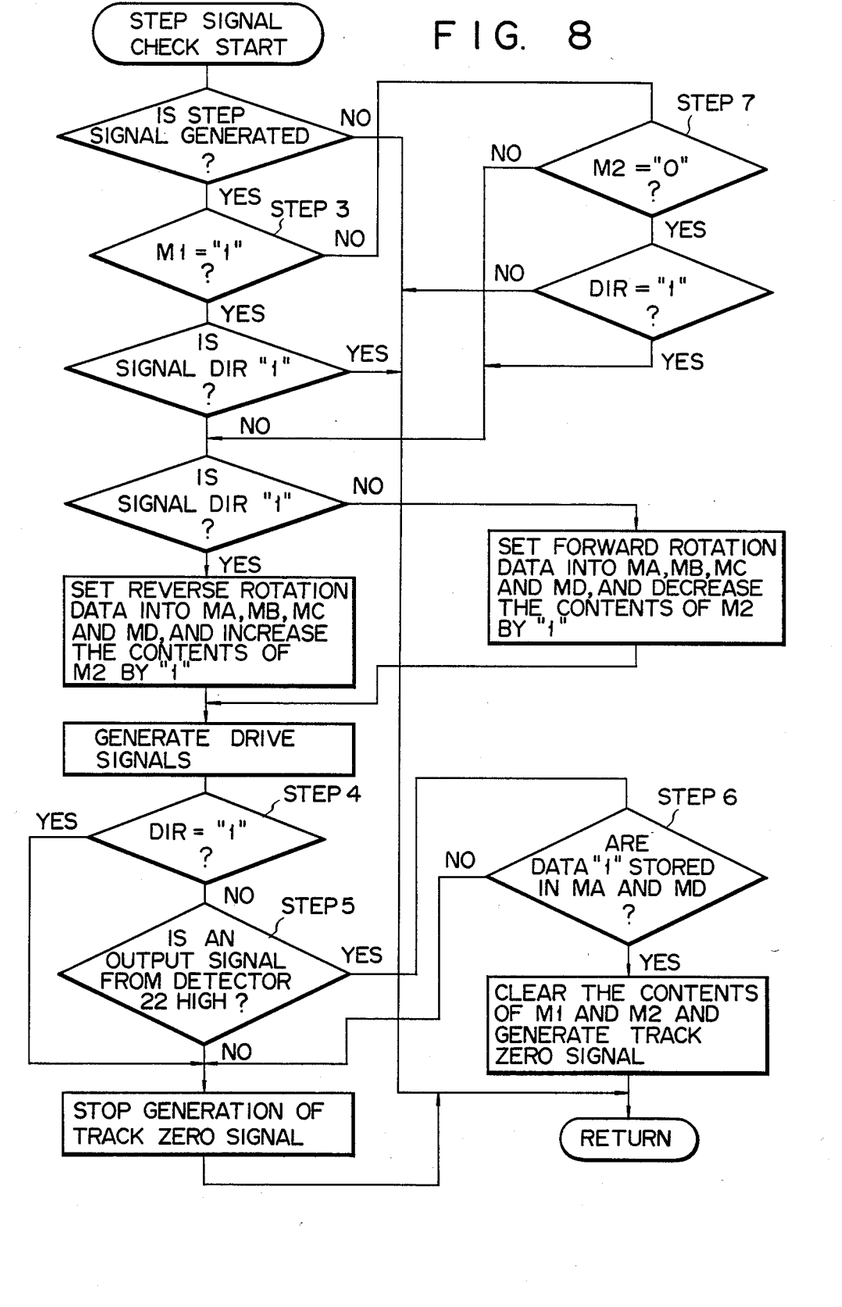
FIG. 8 is a flowchart of a step signal check included in the main routine shown in FIG. 7.

In the execution of the subroutine of the step signal check shown in FIG. 8, the CPU 100 first checks whether or not the step signal STP is generated from the control signal generating circuit 106. When it is detected that the step signal STP is not generated in this step, the CPU 100 performs the next processing in the main routine, i.e., the subroutine of the motor control signal check. In addition, when it is detected that the step signal is generated in this step, the CPU 100 checks whether or not data "1" is stored in the memory area M1 in STEP 3. If it is detected that data "1" is stored in the memory area M1 in this STEP 3, the CPU 100 checks whether or not the direction instruction signal DIR from the control signal generating circuit 106 is at "1" level. If it is detected that this direction instruction signal DIR is at "1" level in this step, the CPU 100 returns to the main routine. If it is detected that the direction instruction signal DIR is at "0" level in this step, the CPU 100 stores data, such as to allow the motor 12 to be rotated in the forward direction, in the memory areas MA, MB, MC and MD, respectively, and at the same time it decreases the content of the memory area M2 by one count. Thereafter, the drive signals $\phi_A$, $\phi_B$, $\phi_C$ and $\phi_D$ corresponding to the contents of the memory areas MA, MB, MC and MD are generated, thereby causing the motor 12 to be rotated by one step in the forward direction to move the magnetic head 16 by one track in the outer peripheral direction. Next, if the CPU 100 detects in STEP 4 that the direction instruction signal DIR is at "0" level, the CPU 100 checks in STEP 5 whether or not an output signal from the detector 22 is at a high level, namely, whether or not the light from the light emitting diode 22A is interrupted by the projecting portion 10A. In the case where it is detected that a low-level signal is generated from this detector 22 in this step, the CPU 100 stops the generation of a track zero signal. When detecting that the direction instruction signal DIR is at "1" level in STEP 4, the CPU 100 inhibits the generation of a track zero signal. In addition, if it is detected that a high-level signal is generated from the detector 22 in STEP 5, the CPU 100 checks in STEP 6 whether or not data "1", "0", "0" and "1" are stored in the memory areas MA, MB, MC and MD, respectively, namely, whether or not the magnetic head is in the track zero position. If an answer in this STEP 6 is "YES", the CPU 100 clears the contents of the memory areas M1 and M2 and thereafter generates a track zero signal. If the answer is "NO" in this STEP 6, the CPU 100 stops the generation of a track zero signal.

In the case where data "0" is set into the memory area M1 in STEP 2, the CPU 100 checks whether or not data "0" is stored in the memory area M2 in STEP 7. If an answer in this STEP 7 is "YES", i.e., if it is detected that the magnetic head 16 is in the track zero position, it is checked whether or not the direction instruction signal DIR is at "1" level. When it is detected that the direction instruction signal of "0" level is generated, the CPU 100 returns the processing to the main routine, while when it is detected that the direction instruction signal of "1" level is generated, the CPU 100 writes data for allowing the motor 12 to be rotated in the reverse direction into the memory areas MA, MB, MC and MD and at the same time increases the content of the memory area M2 by one count. Thereafter, the drive signals $\phi_A$, $\phi_B$, $\phi_C$ and $\phi_D$ correspondig to the contents of the memory areas MA, MB, MC and MD are generated to move the magnetic head 16 by one track in the inner direction of the floppy disk and then the processing in the previously-described STEP 4 is executed. In addition, if it is detected that data "0" is not stored in the memory area M2 in STEP 7, CPU 100 checks whether or not the direction instruction signal DIR is at "1" level. Then, according to the level of the direction instruction signal DIR the CPU 100 writes the data to rotate the motor 12 forwardly or reversely in the memory areas MA, MB, MC and MD as described previously and decreases or increases the content of the memory area M2 by one count, and thereafter the magnetic head 16 is moved by one track in the outer or inner peripheral direction of the floppy disk.

Assume now that the magnetic head 16 is moved in the outer peripheral direction in the state in which data "1" is stored in the memory area M1 and the movement of the magnetic head 16 in the inner peripheral direction of the floppy disk is inhibited. In this case, when, in STEP 3, it is detected that data "1" is stored in the memory area M1 and that the direction instruction signal DIR of "0" level is generated, the CPU 100 writes the data to rotate the motor 12 in the forward direction in the memory areas MA, MB, MC and MD and at the same time decreases the content of the memory area M2 by one count, and thereafter it supplies the drive signals $\phi_A$, $\phi_B$, $\phi_C$ and $\phi_D$ to the motor driver 112, thereby rotating the motor 12 by one step in the forward direction. Due to this, the magnetic head 16 is moved by one track in the outer peripheral direction of the floppy disk. Similar operations are repeatedly executed so long as the step signal and direction instruction signal of "0" level are generated from the control signal generating circuit 106. Thereafter, when the magnetic head 16 reaches near the outer peripheral limit location and the light from the light emitting diode 22A to the phototransistor 22B is interrupted by the projecting portion 10A, the CPU 100 detects that a high-level signal is generated from the detector 22 in STEP 5 and then executes the processing of STEP 6. In this STEP 6, the CPU 100 generates the drive signals $\phi_A$, $\phi_B$, $\phi_C$ and $\phi_D$ to further rotate the motor 12 in the forward direction until it is detected that data "1", "0", "0", and "1" are stored in the memory areas MA, MB, MC and MD in this STEP 6. If it is detected that data "1", "0", "0" and "1" are respectively stored in the memory areas MA, MB, MC and MD in this STEP 6, the CPU 100 clears the contents of the memory areas M1 and M2 and generates a track zero signal. In the case where the subroutine of this step signal check is executed in the subsequent cycle, it is detected that data "0" are stored in the memory areas M1 and M2 in STEPs 3 and 6 and it is further detected that the direction instruction signal of "0" level is generated, and this step signal check subroutine is completed. Thereafter, when the direction instruction signal DIR from the control signal generating circuit 106 becomes a "1" level, the CPU 100 writes the data to rotate the motor 12 reversely in the memory areas MA, MB, MC and MD and at the same time increases the content of the memory area M2 by one count. Then, the drive signals $\phi_A$, $\phi_B$, $\phi_C$ and $\phi_D$ corresponding to the data in the memory areas MA, MB, MC and MD are generated, thereby causing the magnetic head 16 to be moved by one track in the inner direction of the floppy disk. Thereafter, the processings of STEP 4 and STEP 5 are executed and then the CPU 100 stops the generation of a track zero signal. In the subroutine of the step signal check in the subsequent cycle, the magentic head 16 is moved by one track at a time in the inner direction of the floppy disk and the content of the memory area M2 is also increased by one count. It should be noted that when the direction instruction signal DIR is at "1" level, STEP 4 is executed and STEP 5 is not executed. That is, when the magnetic head 16 is moved in the inner direction of the floppy disk, a track zero signal will not be generated. Thus, the same effect is obtained as in the embodiments of FIGS. 4 and 5.

Although the present invention has been explained in connection with the embodiments, it is not restricted thereto. In the embodiment of FIGS. 4 and 5, the $\overline{Q}$ output terminal of the flip-flop 36 may be connected to the input terminal of the AND gate 30 instead of the AND gate 34. It is also possible to connect the direction instruction signal DIR directly to the input terminal of the exclusive OR gate 46 in place of the flip-flop 36 and integrating circuit 44. The logic circuit 60 as shown in FIG. 5 may be added to the embodiment shown in FIG. 4.

What is claimed is:

1. A floppy disk drive apparatus comprising:
a magnetic head section attached on a carrier;
a control signal generating circuit for generating a step signal and a direction instruction signal;
first drive means for rotating a floppy disk;
second drive means for driving said magnetic head section in the radial direction of said floppy disk in response to the step signal and the direction instruction signal from said control signal generating circuit; and
detecting means for generating an output signal when it detects that said magnetic head section locates in the outer limit location of said floppy disk, said detecting means being inhibited from generating an output signal in response to the direction instruction signal generated for driving said magnetic head section in an inner direction of said floppy disk.

2. A floppy disk drive apparatus according to claim 1, wherein said detecting means includes a detection circuit for generating an output signal when it detects that said magnetic head section is in said outer limit location and an inhibit circuit for generating an inhibit signal to said detection circuit in response to the direction instruction signal generated for driving said magnetic head section in the inner direction of said floppy disk.

3. A floppy disk drive apparatus according to claim 2, wherein said inhibit circuit is a latch circuit for latching data corresponding to the direction instruction signal in response to the step signal.

4. A floppy disk drive apparatus according to claim 3, wherein said detector circuit includes an outer limit location detector for generating an output signal when it detects that said magnetic head section is in said outer limit location and an AND gate circuit connected to receive output signals from said inhibit circuit and outer limit location detector.

5. A floppy disk drive apparatus according to claim 4, further comrising a control circuit for preventing the step signal from being supplied to said second drive means in response to an output signal from said outer limit location detector and the direction instruction signal generated for driving said magnetic head section in an outer direction of said floppy disk.

6. A floppy disk drive apparatus according to claim 5, wherein said control circuit includes an AND circuit.

7. A floppy disk drive apparatus according to claim 2, wherein said detector circuit includes an outer limit location detector for generating an output signal when it detects that said magnetic head section is in said outer limit location and an AND gate circuit connected to receive output signals from said inhibit circuit and outer limit location detector.

8. A floppy disk drive apparatus according to claim 7, further comprising a control circuit for preventing the step signal from being supplied to said second drive means in response to an output signal from said outer limit location detector and the direction instruction signal generated for driving said magnetic head section in an outer direction of said floppy disk.

9. A floppy disk drive apparatus according to claim 8, wherein said control circuit includes an AND circuit.

10. A floppy disk drive apparatus according to claim 1, wherein said detecting means includes a detection circuit for generating an output signal when it detects that said magnetic head section is in a limited area containing said outer limit location, memory means for storing data corresponding to drive signals supplied to said second drive means, and data processing unit for generating an output signal when it detects that said detection circuit generates an output signal and predetermined data is stored in said memory means.

* * * * *